United States Patent
Hughes et al.

(10) Patent No.: US 10,515,339 B1
(45) Date of Patent: Dec. 24, 2019

(54) ERROR CORRECTION SYSTEM FOR ACCOUNTANTS

(75) Inventors: Marie L. Hughes, Fremont, CA (US); Marko Rukonic, San Jose, CA (US); Suresh R. Rao, Cupertino, CA (US); Hung Yip Wu, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1164 days.

(21) Appl. No.: 12/238,318

(22) Filed: Sep. 25, 2008

(51) Int. Cl.
*G06Q 10/10* (2012.01)
*G06Q 10/00* (2012.01)
*G06Q 40/00* (2012.01)

(52) U.S. Cl.
CPC .............. *G06Q 10/10* (2013.01); *G06Q 10/20* (2013.01); *G06Q 40/12* (2013.12)

(58) Field of Classification Search
CPC ................................ G06Q 10/10; G06Q 40/12
See application file for complete search history.

(56) References Cited

U.S. PATENT DOCUMENTS

| 2008/0103996 A1* | 5/2008 | Forman ................ G06N 99/005 706/12 |
| 2009/0006282 A1* | 1/2009 | Roth et al. ....................... 706/12 |
| 2009/0222364 A1* | 9/2009 | McGlynn et al. .............. 705/30 |
| 2009/0222365 A1* | 9/2009 | McGlynn et al. .............. 705/30 |

\* cited by examiner

*Primary Examiner* — A. Hunter Wilder
(74) *Attorney, Agent, or Firm* — Ferguson Braswell Fraser Kubasta PC

(57) ABSTRACT

A method for error correction of a first misclassified transaction that includes receiving a request to correct the first misclassified transaction. The first misclassified transaction is associated with a first client accounting data store of a first client. The first misclassified transaction is associated with a first account, and the request is to change the first account to a second account. The method further includes generating a pattern for account correction based on the request, and applying the pattern to transactions to identify a second misclassified transaction. The transactions are associated with a second client accounting data store of a second client. The method further includes presenting a suggestion of a modification of the second misclassified transaction based on the pattern, and receiving an acceptance of the suggestion.

19 Claims, 11 Drawing Sheets

FIGURE 5A

| 302 Client Assigned Account | 304 Information About Client Assigned Account | 306 Accountant Assigned Account | 308 Information about Accountant Assigned Account | 310 Properties of the Transaction Record |
|---|---|---|---|---|
| Unclassified Inc. | Account Number 1010; No Tax Line Mapping | Interest Inc. | Account Number 1050; Tax Line 10b | Name: C-bank Checking Amount: $10.45 Industry: Restaurant Filing Type: Sole Proprietor |

↙ 300 Accountant A Pattern

FIGURE 5B

| 314 Account Type | 316 Account Name | 318 Tax Line | 320 Keywords |
|---|---|---|---|
| 322 Line 1 → Income | Unclassified Income | | Unclassified, Inc., Income |
| 324 Line 2 → Income | Interest Income | 10b | Bank, Inc. Income, Interest, Checking, Savings |

↙ 312 Normalization Data

FIGURE 5C

| 328 Normalized Client Assigned Account | 330 Normalized Accountant Assigned Account | 310 Properties of the Transaction Record |
|---|---|---|
| Unclassified Income | Interest Income | Name: C-bank Checking Amount: $10.45 Industry: Restaurant Filing Type: Sole Proprietor |

↙ 326 Accountant A Normalized Pattern

FIGURE 5D

332 Transaction Record for Client of Accountant B

| Client Assigned Account | Information About Client Assigned Account | Properties of the Transaction Record |
|---|---|---|
| Unclassified Inc. | Account Type: Income<br>Tax Line: | Name: Local Bank<br>Amount: $0.51<br>Industry: Restaurant<br>Filing Type: Sole Proprietor<br>Memo: Interest |

340 Accountant B Chart of Accounts

| Account Type | Account Name | Tax Line |
|---|---|---|
| Income | Unclassified Income | |
| Income | Bank Interest | 10b |

344 Line 1
346 Line 2

FIGURE 5F

348 Revised Transaction Record for Client of Accountant B

| Accountant Assigned Account | Information About Accountant Assigned Account | Properties of the Transaction Record |
|---|---|---|
| Bank Interest | Account Type: Income<br>Tax Line: 10b | Name: Local Bank<br>Amount: $0.51<br>Industry: Restaurant<br>Filing Type: Sole Proprietor<br>Memo: Interest |

354 — Transaction Record for Client of Accountant C

| Client Assigned Account | Information About Client Assigned Account | Properties of the Transaction Record |
|---|---|---|
| 356 | 358 | 360 |
| Unclassified Inc. | Account Type: Income Tax Line: | Name: Regional Bank<br>Amount: $2.75<br>Industry: Restaurant<br>Filing Type: Sole Proprietor<br>Memo: |

FIGURE 5H

362 Accountant C Pattern

| Client Assigned Account | Information About Client Assigned Account | Accountant Assigned Account | Information about Accountant Assigned Account | Properties of the Transaction Record |
|---|---|---|---|---|
| 364 | 366 | 368 | 370 | 360 |
| Unclassified Inc. | Account Number 1010; No Tax Line Mapping | Misc. Income | Income Tax Line 10A | Name: Regional Bank<br>Amount: $2.75<br>Industry: Restaurant<br>Filing Type: Sole Proprietor |

FIGURE 5I

| Client Assigned Account (374) | Information About Client Assigned Account (376) | Accountant Assigned Account (378) | Information about Accountant Assigned Account (380) | Properties of the Transaction Record (382) |
|---|---|---|---|---|
| Misc. Expense | Expense; Tax Line 71 | Automobile Expense | Expense; Tax Line 58 | Name: Joe's Garage<br>Amount: $310.76<br>Industry: Software<br>Filing Type: S-Corp<br>Memo: Tune Up |

372 Accountant A Pattern

FIGURE 5J

384 Normalized Accountant A Pattern

| Client Assigned Account Normalized (386) | Accountant Assigned Account (388) | Properties of the Transaction Record (390) |
|---|---|---|
| Misc. Expense | Automobile Expense | Name: Joe's Garage<br>Amount: $310.76<br>Industry: Software<br>Filing Type: S-Corp |

392 Transaction Record for Client of Accountant C

| 393 Client Assigned Account | 394 Information About Client Assigned Account | 395 Properties of the Transaction Record |
|---|---|---|
| Misc. Expense | Account Type: Expense<br>Tax Line: 71 | Name: A-A Auto Repair<br>Amount: $200.75<br>Industry: Restaurant<br>Filing Type: S-Corp |

FIGURE 5K

396 Accountant C Pattern

| 397 Client Assigned Account | 398 Information About Client Assigned Account | 400 Accountant Assigned Account | 402 Information about Accountant Assigned Account | 404 Properties of the Transaction Record |
|---|---|---|---|---|
| Misc. Expense | Account Type: Expense;<br>Tax Line: 71 | Operating Expense | Account Type: Expense<br>Tax Line: 55 | Name: A-A Auto Repair<br>Amount: $200.75<br>Industry: Restaurant<br>Filing Type: S-Corp |

406 Transaction Record for Client of Accountant H

| Client Assigned Account (408) | Information About Client Assigned Account (410) | Properties of the Transaction Record (412) |
|---|---|---|
| Misc. Expense | Account Type: Expense<br>Tax Line: 71 | Name: A-A Auto Repair<br>Amount: $650.75<br>Industry: Restaurant<br>Filing Type: S-Corp |

FIGURE 5N

414 Revised Transaction Record for Client of Accountant H

| Accountant Assigned Account (416) | Information About Accountant Assigned Account (418) | Properties of the Transaction Record (412) |
|---|---|---|
| Operating Expense | Account Type: Expense<br>Tax Line: 55 | Name: A-A Auto Repair<br>Amount: $650.75<br>Industry: Restaurant<br>Filing Type: S-Corp |

ERROR CORRECTION SYSTEM FOR ACCOUNTANTS

BACKGROUND

Accounting is a process involving recording, classifying, and summarizing the financial character of an organization. In particular, accounting identifies and classifies the different events that occur to and by the organization to generate reports. For example, such events may include changes in the number of employees, transactions performed, a change in filing status of the business, and other such events. The generated reports may be used by government agencies (e.g., the internal revenue service (IRS), the federal trade commission (FTC)) and individuals (e.g., critics, investors, potential investors) to identify the financial health of the organization and make financial decisions. For example, the reports may be used to determine whether and how to perform financial transactions with the organization. Because the reports are used to make financial decisions, accuracy in the reports is important.

The process of accounting often involves the organization, recording, and classifying of transactions using an accounting application. The accounting application typically generates a file including the organized, recorded, and classified transactions. Typically, an accountant reviews and revises the files for clients (e.g., the business organization) (or business units of a corporate entity directly). Specifically, the accountant reviews the classification of various transactions involving the client (or business unit), determines whether the classification of each transaction is correct, and revises the classification if the classification is incorrect.

SUMMARY

In general, in one aspect, the invention relates to a method for error correction of a first misclassified transaction that includes receiving a request to correct the first misclassified transaction. The first misclassified transaction is associated with a first client accounting data store of a first client. The first misclassified transaction is associated with a first account, and the request is to change the first account to a second account. The method further includes generating a pattern for account correction based on the request, and applying the pattern to transactions to identify a second misclassified transaction. The transactions are associated with a second client accounting data store of a second client. The method further includes presenting a suggestion of a modification of the second misclassified transaction based on the pattern, and receiving an acceptance of the suggestion.

In general, in one aspect, the invention relates to a system for error correction of a first misclassified transaction that includes a user interface executing on a processor. The user interface includes functionality to receive a request to correct the first misclassified transaction. The first misclassified transaction is associated with a first client accounting data store of a first client. The first misclassified transaction is associated with a first account, and the request is to change the first account to a second account. The user interface further includes functionality to present a suggestion of a modification of a second misclassified transaction, and receive an acceptance of the suggestion. The system also includes an accounting engine executing on the processor. The accounting engine includes functionality to generate a pattern for account correction based on the request, and apply the pattern to transactions to identify the second misclassified transaction. The transactions are associated with a second client accounting data store of a second client.

In general, in one aspect, the invention relates to a computer readable medium that includes computer readable program code embodied on the computer readable medium. The computer readable program code causes a computer system to receive a request to correct the first misclassified transaction. The first misclassified transaction is associated with a first client accounting data store of a first client. The first misclassified transaction is associated with a first account, and the request is to change the first account to a second account. The computer readable program code causes a computer system to generate a pattern for account correction based on the request, and apply the pattern to transactions to identify a second misclassified transaction. The transactions are associated with a second client accounting data store of a second client. The computer readable program code causes a computer system to present a suggestion of a modification of the second misclassified transaction based on the pattern, and receive an acceptance of the suggestion.

Other aspects of the invention will be apparent from the following description and the appended claims.

BRIEF DESCRIPTION OF DRAWINGS

FIGS. 5A-5N show an example in accordance with one or more embodiments of the invention.

DETAILED DESCRIPTION

Figure 1:
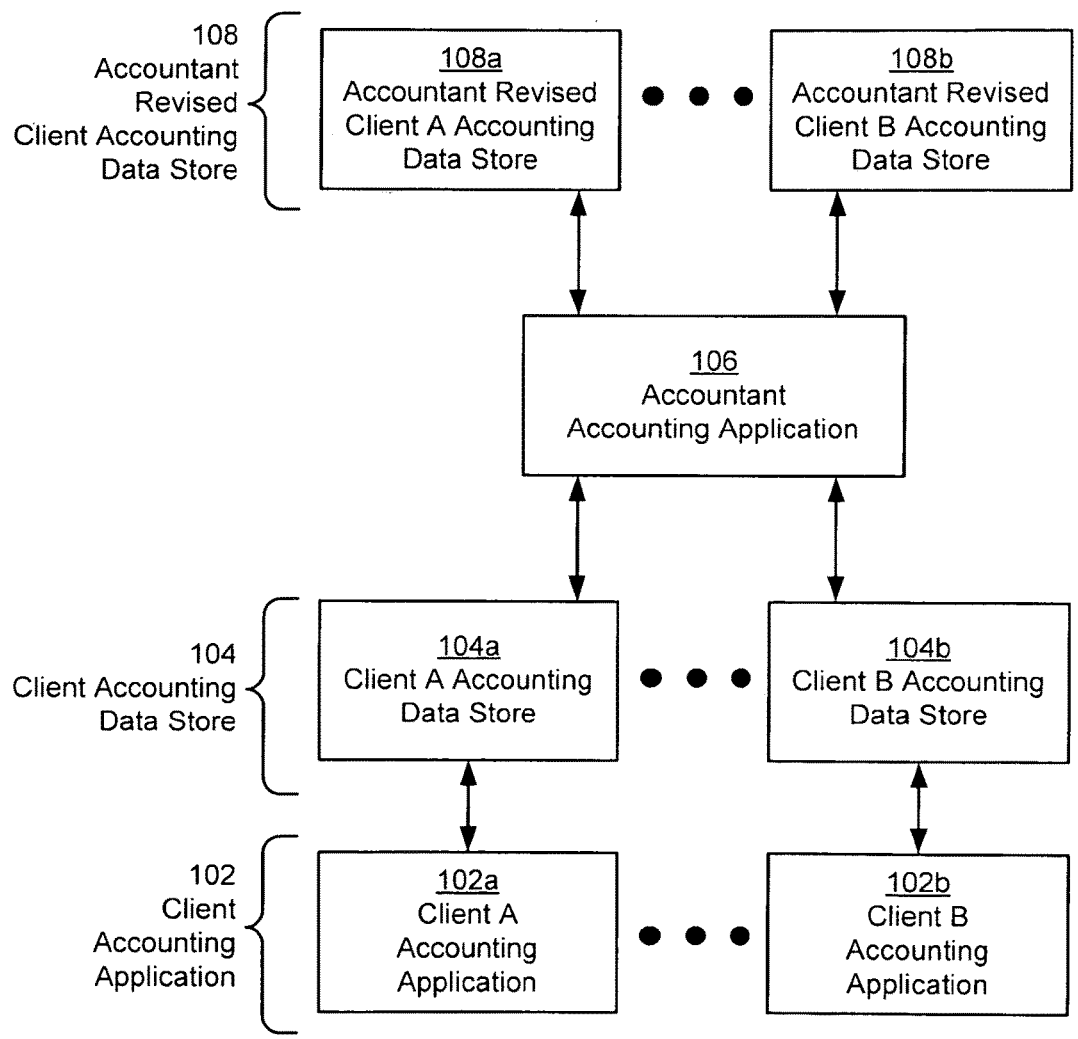
FIGS. 1 and 2 show configurations of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for correcting misclassified transactions. Specifically, while an accountant is reviewing a client's (or business unit's) file, the accountant may correct a misclassified transaction by changing the account associated with the misclassified transaction. In one or more embodiments of the invention, the change to the misclassified transaction is recorded and used to generate a pattern for correction. The pattern may be applied to other transactions to identify potentially misclassified transactions. The other transactions may be for the same client, a different client, and/or for a different accountant. When a transaction is found that matches the pattern, the transaction is deemed potentially misclassified. Accordingly, a suggestion is presented to the accountant to correct the potentially misclassified transaction. The accountant may accept or reject the suggestion. If the accountant accepts the suggestion, then the misclassified transaction is corrected by re-assigning the transaction with the correct account identified by the pattern.

A client (or business unit) is any person, group, and/or organization that performs transactions and uses the services of an accountant. The transactions may involve buying and selling of goods and services. For example, the transactions may include the purchase of raw materials, the selling of a product, the payment to employees for services performed, the payment of rent, and other suitable purchases and payments. Transactions may include sub-transactions. For example, paying an employee may include paying a retirement plan on behalf of the employee, paying healthcare premiums, withholding taxes, and performing other such payments. In another example, buying equipment may include paying for the equipment in installments. In this case, each installment may be considered a separate transaction.

Figure 2:
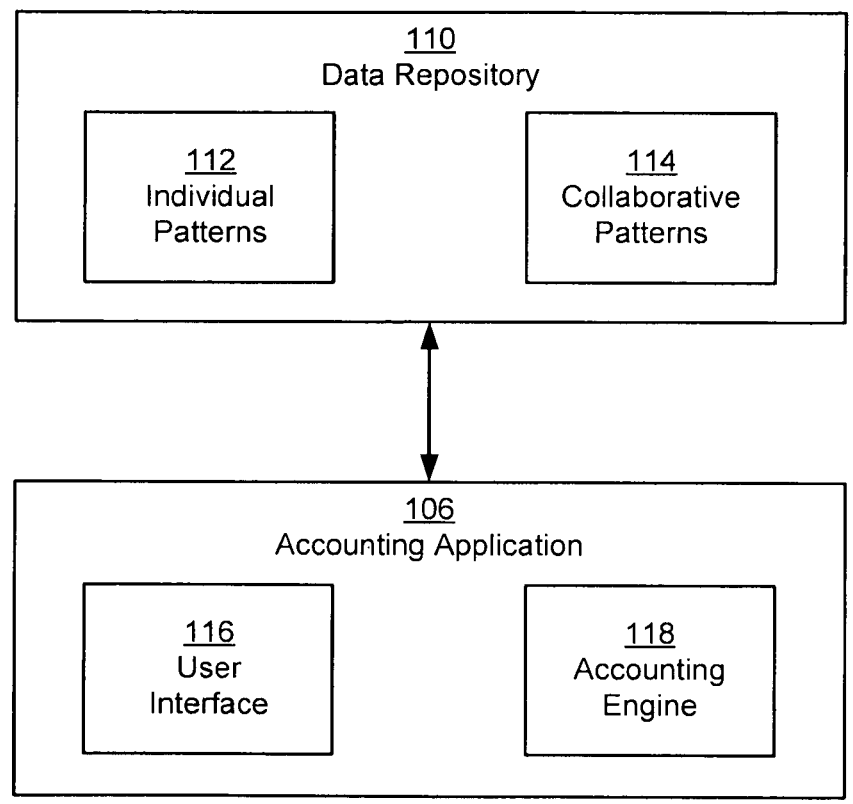

FIGS. 1 and 2 show configurations of a system in accordance with one or more embodiments of the invention. FIG. 1 shows an overview of a system for error correction in accordance with one or more embodiments of the invention. As shown in FIG. 1, the system may include a client accounting application (102), client accounting data store (104), an account accounting application (106), and revised client accounting data store (108). Each of these components is described below.

In general, the accounting applications (e.g., client accounting application (102), accountant accounting application (106)) are software products that assist in recording, classifying, and summarizing the financial character of the client. The client accounting application (102) and the accountant accounting application (106) may be the same or a different software product or version of a software product. Further, the client accounting application (102) and the accountant accounting application (106) may be local or remote to the computer device of the client and the accountant. For example, the client accounting application (102) and/or the accountant accounting application (106) may execute on an application server and may be accessible via the Internet and an Internet browser. Alternatively, the client accounting application (102) and/or the accountant accounting application (106) may execute directly on the client's and/or accountant's computer system.

The client accounting application (102) includes functionality to interact with the client to create the client accounting data store (104). Specifically, the client accounting application (102) includes functionality to record and classify the transactions performed by or on behalf of the client in the client accounting data store (104). Accordingly, the client may use the client accounting application (102) to perform a preliminary classification of each transaction.

In one or more embodiments of the invention, the classification associates at least one account with a transaction. The account(s) associated with the transaction defines the type of transaction. Namely, the account defines how the transaction relates to the financial operations of the client. For example, the account may define the transaction as an income, an expense, a fixed asset, an account receivable, cash, an account payable, a current liability, a long term liability, a credit card, equity, and other such accounts. Further, multiple accounts may be associated with the same transaction. For example, a withholding of federal unemployment tax in a payroll payment to an employee may be associated with a payroll expense account and a payroll tax payable account.

The client accounting application (102) includes functionality to populate the client accounting data store (104) with data. The client accounting data store (104) corresponds to a storage structure (e.g., file, database, etc.) configured to store transaction records for the client. Specifically, the client accounting data store (104) includes a transaction record for each transaction recorded by the client. The transaction record includes an identifier of the account(s) associated with the transaction and information about the transaction, such as a date, a description, an amount, how the transaction was/is paid, and other information used in accounting. The client accounting data store (104) may also include information about the client, such as a name of the client, an industrial category of the client (e.g., building supplies, software, pharmaceutical), a filing status of the client (e.g., partnership, corporation, non-profit organization, etc.), and other information used in accounting.

In one or more embodiments of the invention, the accountant accounting application (106) includes functionality to assist the accountant in revising the client accounting data store (104) for each client. Further, the accountant accounting application (106) includes functionality to generate an accountant revised client accounting data store (108). The accountant revised client accounting data store (108) includes the client accounting data store (104) and any revisions performed by the accountant. The accountant revised client accounting data store (108) may be the same data store as the client accounting data store (104) or may be a new version of the client accounting data store.

For example, consider the scenario in which client A accounting application (102a) is configured to generate client A accounting data store (104a). Client B accounting application (102b) is configured to generate client B accounting data store (104b). The accountant accounting application (106) in the example includes functionality to upload client A accounting data store (104a). Thus, the accountant can revise the transaction records to reflect the correct account that should be associated with each transaction. The revisions may be saved as revised client A accounting data store (108a). If the accountant revises another client of the accountant (e.g., client B), then the revisions of transaction records in client A accounting data store (104a) may be used to revise transaction records in client B accounting data store (104b). Specifically, the accountant accounting application (106) includes functionality to upload client B accounting data store (104b), use prior revisions of a different client to assist in revising the transaction records, and save client B accounting data store (104b) as accountant revised client B accounting data store (108b).

FIG. 2 shows a schematic diagram of the system for the accountant in accordance with one or more embodiments of the invention. As shown in FIG. 2, the system for the accountant includes a data repository (110) and the accountant accounting application (106).

In one or more embodiments of the invention, the data repository (110) is any type of storage unit and/or device (e.g., a file system, database, collection of tables, or any other suitable storage mechanism) for storing data. Further, the data repository (110) may include multiple different storage units and/or devices. The multiple different storage units and/or devices may or may not be of the same type and may or may not be located at the same physical site. For example, a portion of the data repository (110) may be on a local server or other computing device while another portion is distributed across the Internet. In one or more embodiments of the invention, the data repository (110), or a portion thereof, is secure.

In one or more embodiments of the invention, the data repository (110) includes functionality to store patterns for the accountant. A pattern associates properties of a transaction record with a change of the account associated with the transaction record to perform. The properties of the transaction record may include one or more of the following: the time and/or date of the transaction, the time of year (e.g., first quarter, second quarter, etc.) in which the transaction took place, the type of payment used in the transaction, the account assigned by the client to the transaction, the tax line item associated with the account assigned by the client to the transaction, the tax line item associated with the account assigned by the accountant, the name of the account assigned by the accountant, the filing status of the client, the type of transaction, the description of the transaction, the industry of the client, as well as any other information that may be useful in identifying potentially misclassified transactions.

For example, a pattern may associate the properties "description=Medicare" and "client assigned account=payroll clearing" with "new account=payroll tax payable". Thus, transaction records that have "Medicare" for the description and "payroll clearing" as the account assigned by the client match the pattern. Moreover, in the example, the pattern suggests that such transaction records should be assigned the account, "payroll tax payable."

In one or more embodiments of the invention, the data repository groups patterns into individual patterns (112) and collaborative patterns (114). The individual patterns (112) include patterns generated by the accountant. For example, as the accountant is revising the client accounting data store for various clients, a pattern may be generated specifically for the accountant. Such patterns generated for that individual accountant are stored in individual patterns (112).

The collaborative patterns (114) include patterns generated by other accountants that may be used by the accountant. The collaborative patterns (114) may be an aggregation (i.e., a single group) of patterns from each contributing accountant. Alternatively, the collaborative patterns (114) may be grouped according to accounting methodologies followed by each accountant. For example, one group of patterns may be patterns generated by accountants that use cash-basis accounting while another group of patterns may be patterns generated by accountants that use an accrual-basis accounting. Alternatively, the collaborative patterns (114) may be grouped by the accountants that generated the patterns. In such a scenario, each grouping may be associated with a percentage value. The percentage value identifies how often the accountant performing the revision agrees, and conversely disagrees, with any pattern in the group. The percentage values may be used to generate an ordering of suggestions and/or to reject suggestions.

For example, consider the scenario in which accountant A has patterns in group A and accountant B has patterns in group B. Suppose further that accountant C is revising a client's file. As accountant C is revising their client accounting data store, accountant C may be presented with suggestions based on patterns in group A and suggestions based on patterns in group B. Each time that the accountant accepts or rejects a suggestion based on a pattern in group A, the percentage value for group A is updated. Similarly, each time the accountant accepts or rejects a suggestion based on a pattern in group B, the percentage value for group B is updated. In the example, consider the scenario in which both a pattern in group A and a pattern in group B match a transaction record. In such a scenario, the respective percentage values for group A and for group B may be used to determine whether the suggestion to correct the transaction record should be based on the pattern from group A or the pattern from group B. Alternatively, the respective percentage values for group A and for group B may be used to create an ordering of suggestions based on the pattern in group A and the pattern in group B when the suggestions are presented to the user.

Continuing with FIG. 2, the data repository (110) is operatively connected to the accountant accounting application (106). Specifically, the accountant accounting application (106) includes functionality to access the data repository (110) to assist the accountant in revising a client accounting data store. The accountant accounting application (106) includes a user interface (116) and an accounting engine (118).

The user interface (116) includes functionality to receive requests to revise transaction record and transmit the request to the accounting engine (118). The user interface (116) further includes functionality to present suggestions based on patterns to the accountant and receive an acceptance or a rejection of each suggestion. In one or more embodiments of the invention, the user interface is a graphical user interface (GUI). Further, the user interface may include windows, text boxes, buttons, checkboxes, scroll bars, menus, and other components commonly found in graphical user interfaces to achieve the aforementioned functionality.

The accounting engine (118) includes functionality to identify patterns and apply the patterns to transactions in the client accounting data store. Specifically, the accounting engine (118) includes functionality to generate one or more patterns based on at least one correction performed by an accountant. In addition, the accounting engine (118) includes functionality to store patterns in the data repository (110) and retrieve patterns from the data repository (110).

Although shown only in FIG. 1, a client accounting application may include at least a portion of the functionality of the accountant accounting application. For example, the client accounting application may include functionality to receive patterns generated by the accountant of the client and apply the patterns as the client is generating and revising their client accounting data store. Specifically, the client accounting application may include functionality to present suggestions to the client based on patterns generated by the client's accountant. In one or more embodiments of the invention, the accountant registers to allow their clients view their patterns. Similarly, the client may register with the accountant and/or the accountant accounting application to receive the patterns. The registration by the client may require a fee to be paid by the client to the accountant. In the scenario in which the registration requires a fee, the client accounting application and the accountant accounting application may include functionality to transfer the fee from the client to the accountant.

Using the patterns, the client may correct their accounting data store according to patterns generated by their accountant. Thus, the accountant may have fewer revisions required when correcting the client accounting data store.

Figure 3:
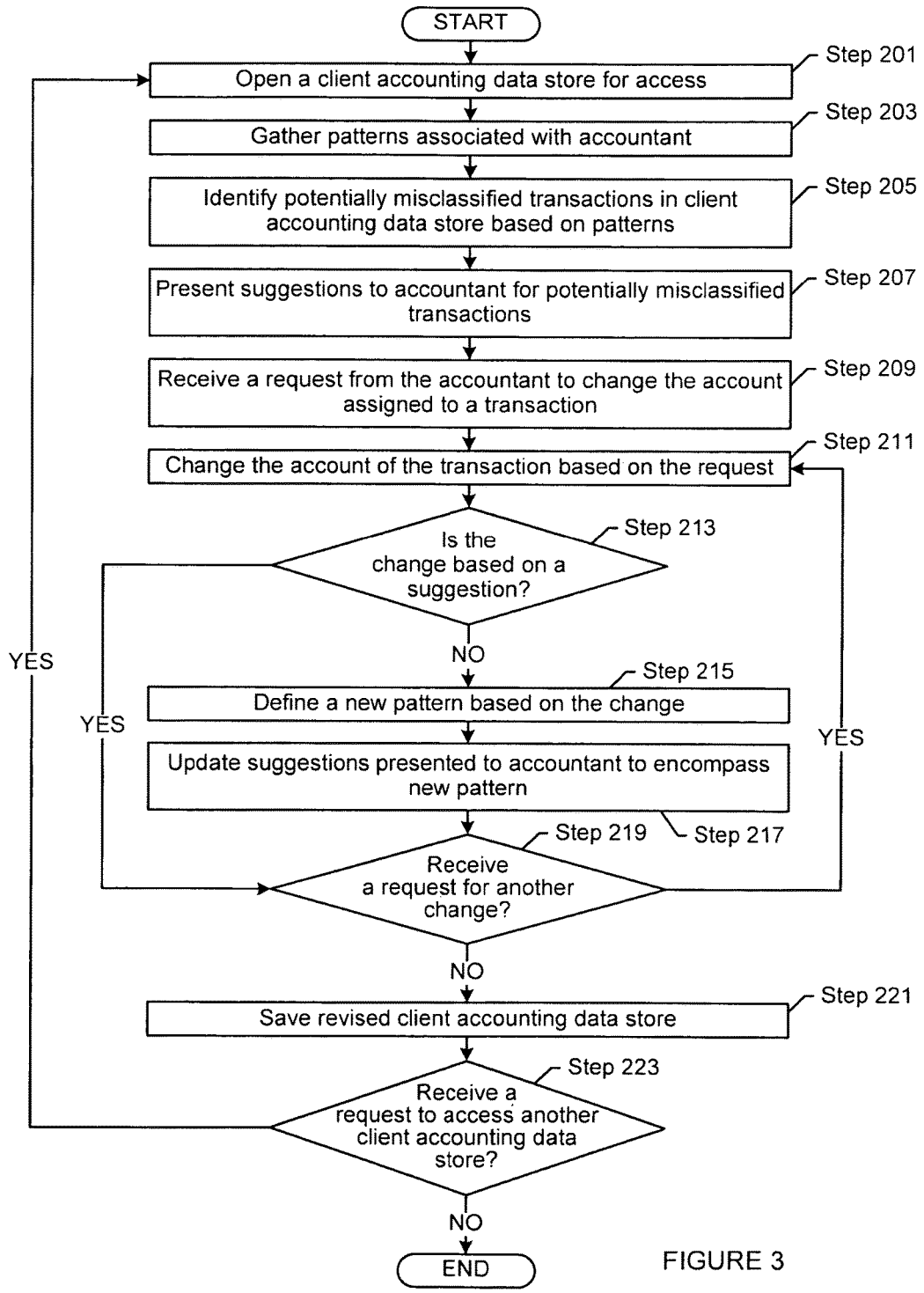
FIGS. 3 and 4 show a flowchart of a method in accordance with one or more embodiments of the invention.
Figure 4:
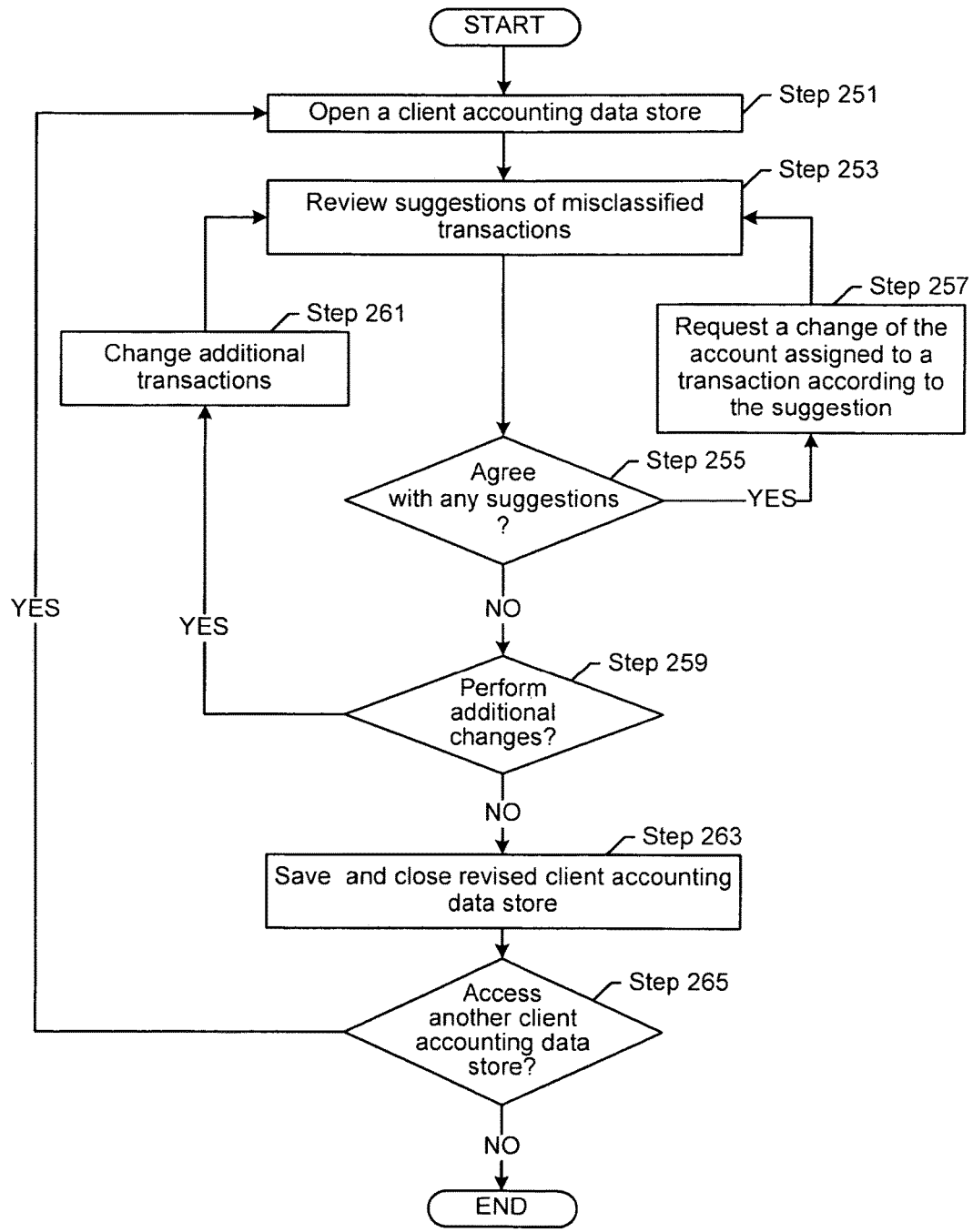

FIGS. 3 and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, well-known steps, such as storing revised accounting data store, have been omitted to simplify the presentation.

FIG. 3 shows a flowchart of a method for an accounting application to correct misclassified transactions in accordance with one or more embodiments of the invention. In Step 201, client accounting data store for a client is opened for access. Opening the client accounting data store may include retrieving the client accounting data store from a central server or from the client, and presenting the transaction data to the accountant.

In Step 203, patterns associated with the accountant are gathered. Specifically, the patterns gathered may include the individual patterns as well as collaborative patterns. Gathering the patterns may include identifying the accountant, accessing the individual patterns based on the identified accountant, and accessing the collaborative patterns according to the accountant. For example, the collaborative patterns may be gathered based on the methodology of the accountant or based on the percentage value assigned to each group of collaborative patterns. Further, the patterns gathered may also be based on the client. Specifically, the gathered patterns are patterns that may apply to a specific client. For example, if the client is a non-profit organization, then the gathered patterns may not include patterns that are specific to corporations.

In Step 205, potentially misclassified transactions are identified in the client accounting data store based on the patterns. In one or more embodiments of the invention, each pattern is compared against the transaction records in the client accounting data store. When a transaction record includes the properties defined in a pattern, then the transaction record is deemed to match the pattern. Such transaction records are identified as potentially misclassified transactions. The pattern matched by the potentially misclassified transactions includes a suggestion as to the correct account to assign the transaction record. Accordingly, the suggestion may be obtained from the pattern in accordance with one or more embodiments of the invention.

In one or more embodiments of the invention, in order to identify potentially misclassified transactions, the properties in the transaction record are first normalized. The normalization may be performed to remove differences in spelling, special characters, and proper names.

In Step 207, suggestions are presented to the accountant for potentially misclassified transactions. The suggestions may be presented in the same window or in a separate window as the transaction records. In one or more embodiments of the invention, when suggestions are presented to the accountant, the suggestion may be presented based on the degree of likelihood that the transactions are misclassified. For example, the suggestions may be grouped according to the transactions that most likely are misclassified, the transactions that may be misclassified, and the transactions that are probably not misclassified but match a pattern. The degree of likelihood may be based on the number of properties in the transaction record that matches the pattern. Alternatively, the degree of likelihood may be based on the methodology of the accountant that generated the pattern or the percentage value associated with the group of patterns.

In Step 209, a request is received from the accountant to change an account assigned to a transaction. Specifically, the accountant may accept a suggestion or may submit an account identifier for a transaction record or for a potentially misclassified transaction. Accordingly, in Step 211, the account is changed based on the request. Specifically, the transaction is assigned the account specified or approved by the accountant. Further, a previous assignment of an account to the transaction may be removed from the transaction record.

In Step 213, a determination is made whether the change is based on a suggestion. In Step 215, if the change is not based on a suggestion, then a new pattern is identified based on the change. The pattern generated identifies properties of the transaction. The pattern may include properties that must exist in the transaction record and properties that may exist in the transaction record. Multiple patterns may be generated by the same change to a transaction. Each of the multiple patterns may include a subset of properties of the transaction record. Further, in one or more embodiments of the invention, the properties in the patterns are normalized. The normalization may be performed to account for differences in spelling, remove special characters, and to remove proper names.

In Step 217, the suggestions presented to the accountant are updated to encompass the new pattern. Updating the suggestions may be performed by re-applying the suggestions to the transactions in the transaction record.

Regardless of whether the change is based on a suggestion (Step 213), a determination is made whether a request is received for another change (Step 219). If a request is received for another change, then the method may repeat for changing the next transaction based on the request (Step 211). Accordingly, the accountant may continue to revise transactions in the client accounting data store.

Returning back to Step 219, if the request is not for another change, then the client accounting data store may be saved as revised client accounting data store (Step 221). Specifically, the client accounting data store may be overwritten with the revisions, or a new accounting data store may be created for the client.

Further, a determination may be made whether a request is received to open another client accounting data store (Step 223). If a request is received to open another client accounting data store, then the next client accounting data store is opened for access (Step 201). Accordingly, the accountant may continue to revise the transactions for each of the accountant's clients. Further, with each subsequent client, the accountant may update and add patterns to the accounting application. Thus, the accountant is given the benefit of the corrections made when revising previous client's accounting data.

Although not discussed above, in one or more embodiments of the invention, different accountants may have different names for the accounts. Thus, the accounts specified in the collaborative patterns may not have the exact same properties as the accounts of the accountant performing the revisions. In such a scenario, identifying potentially misclassified transaction and presenting suggestions may include a matching step to match the accounts defined in the collaborative patterns with the accounts defined by the accountant. Different techniques may be used to perform the matching step. Below are a few of the techniques that may be used.

In one or more embodiments of the invention, the matching step may be performed based on a default set of accounts defined by the accounting application. Specifically, the accounting application may have a default set of accounts which are each pre-associated with a unique identifier (such as an alphanumeric string). If an accountant changes the account name, then the unique identifier may be used to identify the matching account used by another accountant. The matching step may include identifying the unique identifier for the account in the collaborative pattern. The unique identifier may be used to identify the matching account in the set of accounts used by the accountant performing the revisions. The matching account may be presented to the accountant when the suggestion is presented to the accountant.

For example, the default set of accounts may include "sales income" that is associated with a unique identifier, "1243" and "misc. income" with the unique identifier "1345". Accountant X may rename "sales income" to "sales inc." and "misc. income" to "extra income" without changing the unique identifiers. Accountant Y may rename "sales income" to "sale receivables" and "misc. income" to "income" without changing the unique identifiers. Thus, the unique identifier for "sales inc." and for "sale receivables" is 1243. Similarly, the unique identifier for "extra income" and "income" is 1345.

Continuing with the example, consider the scenario in which a client of accountant Y assigns "income" to a transaction. In such an example, the accounting application may identify that income is associated with the 1345 unique identifier. Further, the accounting application may determine that accountant X has a pattern with an account that is also associated with the "1345" income, and lists properties that match the transaction. The pattern from accountant X may list that the transaction should be changed to "sales inc." The accounting application identifies that "sales inc." is assigned the 1243 unique identifier. The 1243 unique identifier may be used to identify the matching account for accountant Y. Namely, because "sales receivables" in the accountant Y's set of accounts is assigned the 1243 identifier, "sales receivables" is presented to accountant Y as a suggestion for changing the transaction.

Another technique for performing a matching step may involve using the tax line associated with the account and/or the account name. Specifically, each account may be associated with a specific tax line that is used to report financial information from the account to the Internal Revenue Service (IRS). For example, sales income is reported in a different tax line from interest income, which is in a different tax line from miscellaneous income. Accounts from different accountants that map to the same tax line may be identified as matching. Rather than just using the tax line, the account names may also be used. For example, if two accounts from different accountant map to the same tax line and have similar account names, then the accounts may be determined to match. Two accounts may be determined to have similar account names when the normalized version of the account names are the same or are within a pre-defined difference from each other.

As an example of using the tax line and the account name, Accountant X may have an account "sales inc." which is associated with tax line M and "extra income" that is associated with tax line N. Accountant Y may have an account "sale receivables" that is associated with tax line M and an account "misc. income" that is associated with tax line N.

Continuing with the example, consider the scenario in which a client of accountant Y assigns "misc. income" to a transaction. In such an example, the accounting application may identify that the "misc. income" account is associated with tax line N. Further, the accounting application may determine that accountant X has a pattern with properties that match the transaction. The account in the pattern that was assigned by the client of accountant X is also associated with tax line N. Accordingly, the accounting application compares the name of "extra income" with "miscellaneous income". The accounting application determines that the names are similar. Because the tax line is the same and the names are similar, the accounting application determines that the pattern from accountant X may be used to generate a suggestion. Accordingly, the accounting application may identify the account that is suggested by the pattern. Specifically, the pattern from accountant X may list that the transaction should be changed to "sales inc." The accounting application identifies that "sales inc." is associated with tax line M. Thus, the accounting application may identify from the accounts of accountant Y that accountant Y has the account "sales receivables" that is also associated with tax line M. Because "sales receivables" is similar to "sales income" and because both accounts map to the same tax line, the accounting application presents the suggestion to accountant Y that the transaction be changed to "sales receivables".

Another technique for performing the matching step may include using the account numbers defined by the Generally Accepted Accounting Principles (GAAP). Specifically, GAAP defines ranges of account numbers. Accounts from different accountants that are assigned a GAAP number in the range may be matched. For example, the range of 40,000 to 49,999 is for accounts that are related to income. Thus, if accountant X has an account P that is assigned the number 41,765 and accountant Y has an account Q that is assigned the account number 45,934, account P may be matched with account Q. Therefore, any pattern from accountant X may be retrieved and a suggestion may be presented to accountant Y based on account P and account Q being in the same GAAP defined range.

Although the above discusses three different techniques for performing a matching step, the techniques may be combined and/or modified without departing from the scope of the invention. In accordance with one or more embodiments of the invention, different techniques may be used without departing from the scope of the invention.

FIG. 4 shows a flowchart of a method for an accountant to correct misclassified transactions in accordance with one or more embodiments of the invention. In step 251, the accountant requests to open a client accounting data store. An accountant request to open a client accounting data store may be performed using techniques known in the art.

When the client accounting data store is opened, the accountant is presented with suggestions of misclassified transactions. In step 253, the accountant reviews the suggestions of misclassified transactions. In step 255, the accountant determines whether the accountant agrees with any of the presented suggestions.

If the accountant agrees with a presented suggestion, then the accountant requests a change of an account assigned to a transaction according to the suggestion (Step 257). For example, the accountant may select an accept button, submit the name of the suggested account, and/or perform other such actions to indicate acceptance.

Alternatively, the accountant may determine that the potentially misclassified transaction is actually correctly classified or that the suggestion does not suggest the appropriate account to assign to the transaction. In such a scenario, the accountant may use the graphical user interface to show that the accountant rejects the suggestion.

In step 259, the accountant determines whether to perform an additional change. Specifically, the accountant may identify other transactions that are misclassified or are associated with suggestions that do not assign the correct account to the transaction. If the accountant determines to perform an additional change, then the accountant changes the additional transactions (Step 261). Based on the change, the suggestions of misclassified may be updated. Accordingly, the accountant may be presented with a new or revised set of suggestions. Thus, the accountant may repeat reviewing transaction records in the client's accounting data store.

If the accountant does not have additional suggestions, then the accountant may save and close the revised client accounting data store (Step 263). Next, the accountant may determine whether to continue revising clients' accounting data. Specifically, a determination is made whether to open another client accounting data store (Step 265). If the determination is made to open another client accounting data store, then accountant may begin revising the next client's accounting data. Accordingly, the accountant may iterate through each of their clients' accounting data and make corrections as necessary.

Although not explicitly discussed above, more than one client accounting data store may be opened at once. Specifically, an accountant may revise transaction records for multiple clients simultaneously without departing from the scope of the invention.

FIGS. 5A-N show an example in accordance with one or more embodiments of the invention. The following example is for explanatory purposes only and not intended to limit the scope of the invention.

For the following example, consider the scenario in which eight accountants (i.e., accountant A, accountant B, accountant C, accountant D, accountant E, accountant F, accountant G, accountant H) are each separately revising their client's transaction records. FIG. 5A shows a pattern (300) that accountant A generates while revising a transaction record for one of accountant A's clients in accordance with one or more embodiments of the invention. As shown in FIG. 5A, accountant A's client assigns to the transaction the "unclassified inc." account. The "unclassified inc." account includes certain information (304), such as that the account is assigned an account number 1010, and no tax line mapping exists for the account. After reviewing properties of the transaction record, accountant A realizes that the transaction record is misclassified. Accordingly, accountant A changes the account to "interest inc" (306). The "interest inc." account includes certain information (308), such as that the account maps to account number 1050 according to GAAP, and the account maps to tax line "10b".

The accountant accounting application may record at least a portion of the properties of the transaction record (310) in the accountant A pattern (300). Specifically, the accountant accounting application may record that the amount of $10.45 was received from "C-Bank" checking, the industry of the client is the restaurant industry, and the client files as a sole proprietorship. The properties of the transaction record (310) may be used to identify similar transactions. Further, those skilled in the art will appreciate that different or additional properties may be used without departing from the scope of the invention.

FIG. 5B shows normalization data (312) that may be used to normalize the accountant A pattern (shown in FIG. 5A) in accordance with one or more embodiments of the invention. As shown in FIG. 5B, the normalization data may include the account type (314), an account name (316), a tax line (318), and keywords (310) for each of the different accounts that may be assigned to a transaction. Thus, as shown in line 1 (322) of FIG. 5B, the "unclassified inc." account assigned by accountant A's client maps to "unclassified income" and is associated with the keywords, "unclassified", "inc.", and "income". As shown in line 2 (324), the "interest inc." account assigned by accountant A maps to "interest income" and is associated with the keywords, "bank", "inc.", "income", "interest", "checking", and "savings". The normalization data may be used to normalize the accountant A's patterns so that other accountants may use the pattern.

FIG. 5C shows an accountant A normalized pattern (326) in accordance with one or more embodiments of the invention. Specifically, FIG. 5C shows the normalized version of the accountant A pattern shown in FIG. 5A. The accountant A pattern is normalized using the normalization data shown in FIG. 5B. As shown in FIG. 5C, the normalized pattern (326) identifies the normalized client assigned account (320) as "unclassified income", the normalized accountant assigned account (330) as "interest income", and the properties of the transaction record (310). The normalized pattern (326) may be used to assist other accountants in classifying transactions.

For example, FIG. 5D shows a transaction record for the client of accountant B (332) in accordance with one or more embodiments of the invention. As shown in FIG. 5D, the client assigned account (334) is "unclassified inc.". Information about the client assigned account (336) identifies that, to accountant B, the account type is "income" and a tax line does not map to the account. The properties of the transaction record (338) provide details about the transaction and the client of accountant B. Specifically, the properties of the transaction record (340) identify that 51 cents was received from a local bank for interest. The properties of the transaction record (340) further identify the industry of the client as a restaurant and that the filing type of the client of accountant B is a sole proprietor.

The accounting application may identify that the normalized pattern generated by accountant A shown in FIG. 5C matches the transaction record for the client of accountant B shown in FIG. 5D. However, each accountant has a different set of accounts used. Continuing with the example, since accountant A and accountant B may not use the same set of accounts on their respective client's transaction records, the accountant's chart of accounts may be used to identify accountant B's corresponding account for the transaction record for client of accountant B (332). FIG. 5E shows an example chart of accounts (340) for accountant B. As shown in line 1 (344) of the chart of accounts (340), the unclassified income has an account type of income and is not associated with a tax line. As shown in line 2 (346) of the chart of accounts (340), the bank interest has an account type of income and is associated with tax line 10b. Because the bank interest account of accountant B as shown in FIG. 5E matches the keywords of the interest income account of accountant A as shown in FIG. 5B, the accounting application may suggest to accountant B that the transaction record shown in FIG. 5D be assigned to the "bank interest" account.

In the example, suppose accountant B accepts the suggestion made by the accounting application. FIG. 5F shows the revised transaction record for the client of accountant B (348) after accountant B accepts the suggestion in accordance with one or more embodiments of the invention. As shown in FIG. 5F, the revised transaction record (348) includes the accountant assigned account of "bank interest", and information about the accountant assigned account (350) as income with a tax line of 10b.

Continuing with the example, accountant C reviews transaction records for accountant C's clients. FIG. 5G shows a transaction record for the client of accountant C (354). As shown in FIG. 5G, the client assigned account (356) is "unclassified inc.". Information about the client assigned account (358) identifies, to accountant C, that the account type is "income" and a tax line does not map to the account. The properties of the transaction record (360) identify that $2.75 was received from regional bank. The properties of the transaction record (360) further identify the industry of the client as a restaurant and that the filing type of the client of accountant B is a sole proprietor. Because the transaction record for the client of accountant C (354) matches the normalized pattern generated by accountant A (shown in FIG. 5C), the accounting application may suggest to accountant C that the account assigned to the transaction record be changed to interest income. However, consider the scenario in which, because accountant C does not agree with the suggested assignment, accountant C rejects the suggestion made by the accounting application. Instead, accountant C assigns the "miscellaneous income" (misc.) account to the transaction record for the client of accountant C (354).

The assignment of "miscellaneous income" by accounting C generates the accountant C pattern (362) shown in FIG. 5H. As shown in FIG. 5H, accountant C pattern (362) shows that the client assigned account (364) is the "unclassified inc." account. The "unclassified inc." account maps to account number 1010 according to GAAP, and no tax line mapping exists for the account as shown in the information about the client assigned account (366). The accountant assigned account (368) is "misc. income", which is an income account with a tax line of "10a" as shown in the information about the accountant assigned account (370). The accountant C pattern (362) also identifies at least a portion of the properties of the transaction record (360) in accordance with one or more embodiments of the invention.

In the example, over the course of error correction of several transaction records by each of the accountants, the accounting application collects data and learns that accountant A, accountant B, accountant D, accountant E, accountant F, and accountant G often agree as to which accounts should be assigned different transactions. Specifically, accountant B, accountant D, accountant E, accountant F, and accountant G often accept suggestions based on accountant A's patterns. Further, the accounting application collects data and learns that although accountant C and accountant H rarely, if ever, accept the suggestions generated from accountant A's patterns, they often accept suggestions from each other's patterns.

Continuing with the example, upon making the above observations, accountant A corrects a misclassified transaction for another client of accountant A to generate the accountant A pattern shown in FIG. 5I. The accountant A pattern (372) shows that the client assigned account (374) is a "misc. expense" account. The "misc. expense" account is an expense account that maps to tax line 71, as shown in the information about the client assigned account (376). The accountant assigned account (378) is "automobile expense" which is an expense account with a tax line of "58" as shown in the information about the accountant assigned account (380). The accountant A pattern (372) also identifies at least a portion of the properties of the transaction record (382), such as that $310.71 was paid to Joe's Garage for a tune-up and that the client is corporation that files under subchapter S of chapter 1 of the internal revenue code (i.e., an S-Corp), and is in the software industry in accordance with one or more embodiments of the invention.

The accountant A pattern (372) shown in FIG. 5I may be used to generate the normalized accountant A pattern (384) shown in FIG. 5J in accordance with one or more embodiments of the invention. As shown in FIG. 5J, the normalized accountant A pattern (384) identifies that the client assigned account (386) is miscellaneous expense, the accountant assigned account (388) is automobile expense, and at least a portion of the properties of the transaction record (390). Accordingly, when accountant B, accountant D, accountant E, accountant F, and accountant G encounter a similar transaction to the transaction that generated the normalized accountant A pattern (384), the normalized accountant A pattern (384) is used to suggest corrections for each similar transaction.

Next, in the example, a transaction record for the client of accountant C (392) shown in FIG. 5K includes a transaction that matches the normalized accountant A pattern (384) shown in FIG. 5J. Specifically, as shown in FIG. 5K, the client assigned account (393) is misc. expense, the information about the client assigned account (394) shows that the account type is expense and the tax line is 71. The properties of the transaction (395) show that the transaction is paying $200.75 to Car-Stop Auto Repair, and the client is an S-Corp in the restaurant industry. Because of the similarity in terms of the name of the transaction, the amount of the transaction, the filing type of the client, and the account assigned by the client, the accounting application may suggest changing the account assigned to the transaction record based on the normalized accountant A pattern (384) shown in FIG. 5J in accordance with one or more embodiments of the invention.

However, suppose accountant C rejects the suggestion made by the accounting application. Specifically, accountant C revises the transaction to generate the accountant C pattern (396) shown in FIG. 5L in accordance with one or more embodiments of the invention. Accountant C pattern (396) shows that the client assigned account (397) is "misc. expense" account. The "misc. expense" account is an expense account that maps to tax line 71, as shown in the information about the client assigned account (398). The accountant assigned account (400) is "operating expense" which is an expense account with a tax line of "55" as shown in information about the accountant assigned account (402). The accountant C pattern (396) also identifies at least a portion of the properties of the transaction record (404) in accordance with one or more embodiments of the invention.

Continuing with the example, a transaction record for the client of accountant H (406) shown in FIG. 5M includes a transaction that matches the normalized accountant A pattern (384) shown in FIG. 5J and the accountant C pattern (396) shown in FIG. 5L. Specifically, as shown in FIG. 5M, the client assigned account (408) is misc. expense, the information about the client assigned account (410) shows that the account type is expense and the tax line is 71. The properties of the transaction (412) show that the transaction is paying $650.75 to A-A Auto Repair, and the client is an S-Corp in the restaurant industry. Because of the similarity between the patterns and the transaction record, and because accountant H generally disagrees with accountant A and agrees with accountant C, the accounting application may suggest changing the account assigned to the transaction record based on the accountant C pattern (396) shown in FIG. 5L in accordance with one or more embodiments of the invention.

In this case, accountant H accepts the suggestion made by the accounting application. Accordingly, as shown in FIG. 5N, the revised transaction for the client of accountant H (414) identifies that the accountant assigned account (416) is operating expense, the information about the accountant assigned account (418) identifies the account as an expense account with a tax line of 55, and includes the properties of the transaction record (412).

As shown by way of the example above, embodiments of the invention assist accountants in correcting the accounts assigned to different transactions. Specifically, past changes to transaction records assist both the accountant and other accountants in making future changes. Additionally, by using a mapping between accounts, one or more embodiments of the invention can ensure that the suggestions presented suggest the account in the accountants list of accounts. Namely, the account suggested is actually used by the accountant even though the pattern may be generated from a different set of accounts. Moreover, one or more embodiments of the invention track which accountants generally agree and which accountants generally do not agree and apply patterns accordingly. Thus, suggestions may be tailored to the specific accountant.

Further, because the accountants are generating the patterns and accepting suggestions, the accountants can ensure that the patterns comply with local and national laws and rules regarding how to perform accounting. Namely, each accountant has knowledge of the laws and rules of accounting. Embodiments of the invention capitalize on the combined knowledge to assist in classifying transactions and ensure that future classifications are updated when new laws and regulations are passed.

Figure 6:
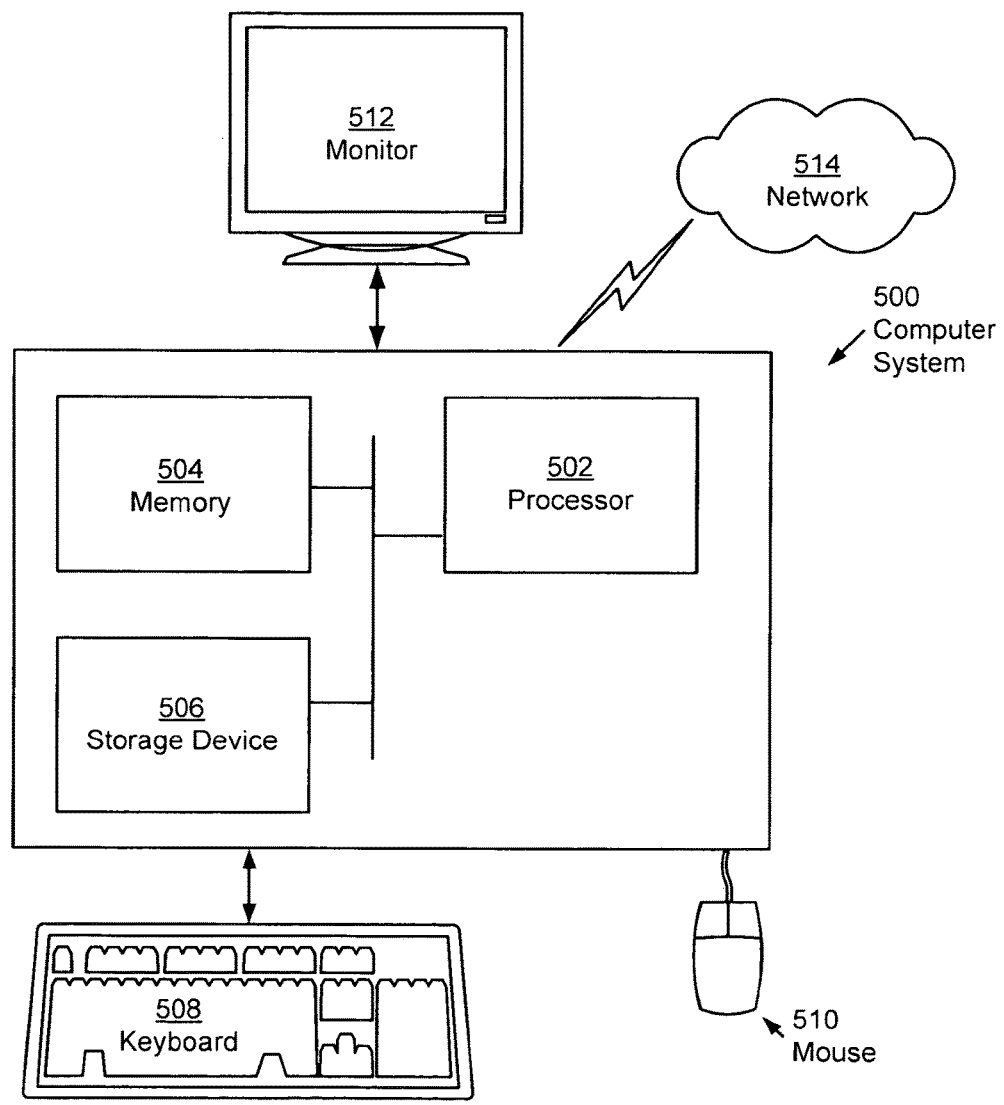
FIG. 6 shows a computer system in accordance with one or more embodiments of the invention.

Embodiments of the invention may be implemented on virtually any type of computer regardless of the platform being used. For example, as shown in FIG. 6, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., accounting engine, user interface, accounting application, data repository, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a tangible computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, at an application server and from a plurality of accounting applications accessing the application server, a plurality of requests to perform a plurality of accounting transactions over a computer network,
      wherein the application server provides a collaborative environment between the plurality of accounting applications accessing the application server,
      wherein the plurality of requests comprises a request to perform a correction to a first misclassified accounting transaction having a first account type,
      wherein the first misclassified accounting transaction is one of the plurality of accounting transactions and is from a first client accounting data store,
      wherein the correction changes the first account type to a second account type, and
      wherein the first misclassified accounting transaction has a classification that is incorrect;
   tracking, by the application server, one or more properties of the plurality of accounting transactions;
   generating, by the application server, a pattern of changes to a transaction record performed by the plurality of accounting applications, wherein the pattern of changes is determined by the application server learning from the plurality of accounting transactions which properties of the first misclassified accounting transaction are incorrect;
   normalizing, by the application server, the properties in the pattern of changes to account for differences in spelling, to remove special characters and to remove proper names;
   presenting, by a graphical user interface of an accounting application of the plurality of accounting applications, transaction data from the plurality of accounting transactions;
   receiving, by the graphical user interface, the request to perform the correction;
   correcting, by the accounting application of the plurality of accounting applications and in response to the request, the first misclassified accounting transaction to correspond to the correction;
   learning, by the application server, to identify a plurality of misclassified accounting transactions including a second misclassified accounting transaction based on suggestion selections from a first group of normalized patterns instead of from a second group of normalized patterns;
   identifying, by the application server and from amongst the plurality of accounting transactions, the second misclassified accounting transaction that matches a pattern of the first group of normalized patterns, wherein the second misclassified accounting transaction is one of the plurality of accounting transactions and is from a second client accounting data store;
   presenting, by the graphical user interface of the accounting application on a display device, a suggestion of the correction to the second misclassified accounting transaction;
   receiving, by the graphical user interface and in response to selection of a graphical user interface component of the graphical user interface, an acceptance of the suggestion on the display device; and correcting, by the accounting application and in response to the acceptance, the second misclassified accounting transaction to correspond to the correction.

2. The method of claim 1, wherein the pattern comprises a description of the first misclassified accounting transaction, the first account type, and the second account type.

3. The method of claim 2, wherein the pattern further comprises at least one selected from a group consisting of a filing status of a client, a time of the first misclassified accounting transaction, a time of year of the first misclassified accounting transaction, an amount of the first misclassified accounting transaction, and an industry of the client.

4. The method of claim 1, wherein the suggestion comprises a ranking of a plurality of account types for revising the second misclassified accounting transaction, and wherein the second account type is in the ranking.

5. The method of claim 1, further comprising:
identifying a third misclassified accounting transaction associated with the pattern and a second pattern;
obtaining a first percentage value identifying a percentage of accountants that use the pattern for reclassification;
obtaining a second percentage value identifying the percentage of accountants that use the second pattern for reclassification, wherein the second percentage value exceeds the first percentage value; and
applying the second pattern to the third misclassified accounting transaction based on the second percentage value exceeding the first percentage value.

6. The method of claim 1, wherein the pattern comprises an account type, an account number, a tax line, and a plurality of keywords.

7. A system comprising:
a display device;
an input device; and
a user interface executing on a processor and configured to:
present, by a graphical user interface of an accounting application of a plurality of accounting applications, transaction data from a plurality of accounting transactions;
receive by the graphical user interface, the request to perform the correction;
transmit, to an application server and from an accounting application, a request to perform a correction to a first misclassified accounting transaction having a first account type,
wherein the first misclassified accounting transaction is from a first client accounting data store,
wherein the correction changes the first account type to a second account type, and wherein a classification of the first misclassified accounting transaction is incorrect,
wherein the application server provides a collaborative environment between the plurality of accounting applications, and
wherein the application server receives, over a computer network, a plurality of requests to perform the plurality of accounting transactions;
present, by the graphical user interface of the accounting application on the display device, a suggestion of the correction to a second misclassified accounting transaction; and
receive, by the graphical user interface and in response to selection of a graphical user interface component of the graphical user interface, an acceptance of the suggestion on the display device, wherein the application server comprises an accounting engine executing on the processor and configured to:
track one or more properties of the plurality of accounting transactions;
generate a pattern of changes to a transaction record performed by the plurality of accounting applications, wherein the pattern of changes is determined by the accounting engine on the application server learning from the plurality of accounting transactions which properties of the first misclassified accounting transaction are incorrect;
normalize the properties in the pattern of changes to account for differences in spelling, to remove special characters and to remove proper names;
correct, in response to the request, the first misclassified accounting transaction to correspond to the correction;
learn to identify a plurality of misclassified accounting transactions including the second misclassified accounting transaction based on suggestion selections from a first group of normalized patterns instead of from a second group of normalized patterns;
identify from amongst the plurality of accounting transactions the second misclassified accounting transaction that matches a pattern of the first group of normalized patterns, wherein the second misclassified accounting transaction is one of the plurality of accounting transactions and is from the second client accounting data store of the second client; and
correct, in response to the acceptance from the second accountant, the second misclassified accounting transaction to correspond to the correction.

8. The system of claim 7, further comprising:
a data repository configured to store the pattern.

9. The system of claim 7, wherein the pattern comprises a description of the first misclassified accounting transaction, the first account type, and the second account type.

10. The system of claim 9, wherein the pattern further comprises at least one selected from a group consisting of a filing status of a client, a time of the first misclassified accounting transaction, a time of year of the first misclassified accounting transaction, an amount of the first misclassified accounting transaction, and an industry of the client.

11. The system of claim 7, wherein the suggestion comprises a ranking of a plurality of account types for revising the second misclassified accounting transaction, and wherein the second account type is in the ranking.

12. The system of claim 7, wherein the accounting engine is further configured to:
identify a third misclassified accounting transaction associated with the pattern and a second pattern;
obtain a first percentage value identifying a percentage of accountants that use the pattern for reclassification;
obtain a second percentage value identifying the percentage of accountants that use the second pattern for reclassification, wherein the second percentage value exceeds the first percentage value; and
apply the second pattern to the third misclassified accounting transaction based on the second percentage value exceeding the first percentage value.

13. The system of claim 7, wherein the pattern comprises an account type, an account number, a tax line, and a plurality of keywords.

14. A non-transitory computer readable storage medium storing instructions, the instructions executable on a processor and comprising functionality to:

receive, at an application server and from a plurality of accounting applications accessing the application server, a plurality of requests to perform a plurality of accounting transactions,
- wherein the application server provides a collaborative environment between the plurality of accounting applications accessing the application server,
- wherein the plurality of requests comprises a request to perform a correction that corresponds to a first misclassified accounting transaction having a first account type,
- wherein the first misclassified accounting transaction is one of the plurality of accounting transactions and is from a first client accounting data store,
- wherein the correction changes the first account type to a second account type, and
- wherein the first misclassified accounting transaction has a classification that is incorrect;

track, by the application server, one or more properties of the plurality of accounting transactions;

generate, by the application server, a pattern of changes to a transaction record performed by the plurality of accounting applications, wherein the pattern of changes is determined by the application server learning from the plurality of accounting transactions which properties of the first misclassified accounting transaction are incorrect;

normalize, by the application server, the properties in the pattern of changes to account for differences in spelling, to remove special characters and to remove proper names;

present, by a graphical user interface of an accounting application of the plurality of accounting applications, transaction data from the plurality of accounting transactions;

receive, by the graphical user interface, the request to perform the correction;

correct, by the accounting application of the plurality of accounting applications and in response to the request, the first misclassified accounting transaction to correspond to the correction;

learn, by the application server, to identify a plurality of misclassified accounting transactions including a second misclassified accounting transaction based on suggestion selections from a first group of normalized patterns instead of from a second group of normalized patterns;

identify from amongst the plurality of accounting transactions, the second misclassified accounting transaction that matches a pattern of the first group of normalized patterns, wherein the second misclassified accounting transaction is one of the plurality of accounting transactions and is from a second client accounting data store of a second client;

present, by the graphical user interface of the accounting application on a display device, a suggestion of the correction to the second misclassified accounting transaction;

receive, by the graphical user interface and in response to selection of a graphical user interface component of the graphical user interface, an acceptance of the suggestion on the display device; and correct, by the accounting application and in response to the acceptance, the second misclassified accounting transaction to correspond to the correction.

15. The non-transitory computer readable storage medium of claim 14, wherein the pattern comprises a description of the first misclassified accounting transaction, the first account type, and the second account type.

16. The non-transitory computer readable storage medium of claim 15, wherein the pattern further comprises at least one selected from a group consisting of a filing status of a client, a time of the first misclassified accounting transaction, a time of year of the first misclassified accounting transaction, an amount of the first misclassified accounting transaction, and an industry of the client.

17. The non-transitory computer readable storage medium of claim 14, wherein the suggestion comprises a ranking of a plurality of account types for revising the second misclassified accounting transaction, and wherein the second account type is in the ranking.

18. The non-transitory computer readable storage medium of claim 14, the instructions further comprising functionality to:
- identify a third misclassified accounting transaction associated with the pattern and a second pattern;
- obtain a first percentage value identifying a percentage of accountants that use the pattern for reclassification;
- obtain a second percentage value identifying the percentage of accountants that use the second pattern for reclassification, wherein the second percentage value exceeds the first percentage value; and
- apply the second pattern to the third misclassified accounting transaction based on the second percentage value exceeding the first percentage value.

19. The non-transitory computer readable storage medium of claim 14, wherein the pattern comprises an account type, an account number, a tax line, and a plurality of keywords.

* * * * *